United States Patent
Denzler et al.

(10) Patent No.: US 11,349,142 B2
(45) Date of Patent: May 31, 2022

(54) FUEL CELL MODULE

(71) Applicant: Hexis AG, Winterthur (CH)

(72) Inventors: Roland Denzler, Weisslinqen (CH); Andreas Mai, Constance (DE); Fabian Brogle, Öhninqen (DE)

(73) Assignee: HEXIS AG, Winterthur (CH)

( * ) Notice: Subject to any disclaimer, the term of this patent is extended or adjusted under 35 U.S.C. 154(b) by 41 days.

(21) Appl. No.: 14/959,254

(22) Filed: Dec. 4, 2015

(65) Prior Publication Data
US 2016/0181649 A1   Jun. 23, 2016

(30) Foreign Application Priority Data

Dec. 19, 2014 (EP) .................... 14199229

(51) Int. Cl.
*H01M 8/04* (2016.01)
*H01M 8/24* (2016.01)
(Continued)

(52) U.S. Cl.
CPC ....... *H01M 8/2465* (2013.01); *H01M 8/0206* (2013.01); *H01M 8/04201* (2013.01);
(Continued)

(58) Field of Classification Search
CPC .................................................... H01M 8/24
See application file for complete search history.

(56) References Cited

U.S. PATENT DOCUMENTS 4,476,197 A * 10/1984 Herceg ............... H01M 8/2435
429/456
5,501,200 A * 3/1996 Bogartz .................. F02B 43/00
123/527
(Continued)

FOREIGN PATENT DOCUMENTS

EP   0814526 A1   12/1997
EP   1037296 A1    9/2000
(Continued)

OTHER PUBLICATIONS

European Search Report dated May 4, 2016 in European Patent Application No. 15190345.7, filed Apr. 22, 2016.
(Continued)

*Primary Examiner* — Cynthia H Kelly
*Assistant Examiner* — Julian Anthony
(74) *Attorney, Agent, or Firm* — Global IP Counselors, LLP

(57) ABSTRACT

A fuel cell module includes fuel cells, a gas supply system, a first accumulator, a second accumulator, and power connection. The fuel cells are arranged in a cell stack having a first axial end and a second axial end. The gas supply system is configured to supply gas for the operation of the fuel cells, the fuel cells being stacked in an axial direction. The first accumulator is arranged at the first axial end of the cell stack. The second accumulator is arranged at the second axial end of the cell stack. The power connection is electrically conductively connected to the second accumulator, and is arranged at the gas supply system. The cell stack is arranged within an insulation sheath and the gas supply system is arranged partly outside the insulation sheath and the power connection is arranged outside the insulation sheath.

16 Claims, 2 Drawing Sheets

(51) Int. Cl.
*H01M 8/2465* (2016.01)
*H01M 8/04082* (2016.01)
*H01M 8/2425* (2016.01)
*H01M 8/0206* (2016.01)
*H01M 8/2475* (2016.01)
*H01M 8/0612* (2016.01)
*H01M 8/12* (2016.01)

(52) U.S. Cl.
CPC ....... *H01M 8/2425* (2013.01); *H01M 8/2475* (2013.01); *H01M 8/0625* (2013.01); *H01M 2008/1293* (2013.01)

(56) References Cited

U.S. PATENT DOCUMENTS

| | | | |
|---|---|---|---|
| 5,998,053 | A | 12/1999 | Diethelm |
| 2001/0046619 | A1 | 12/2001 | Allen |
| 2004/0209151 | A1* | 10/2004 | Hase .................. H01M 8/0232 429/439 |
| 2006/0093890 | A1* | 5/2006 | Steinbroner .......... H01M 8/248 429/430 |
| 2008/0057374 | A1* | 3/2008 | Kurosawa ......... H01M 8/04089 429/444 |
| 2011/0123881 | A1* | 5/2011 | Nakamura ............. B01B 1/005 429/423 |
| 2011/0262819 | A1 | 10/2011 | Crumm et al. |
| 2013/0136953 | A1* | 5/2013 | Devoe ................ H01M 8/1226 429/1 |
| 2014/0087231 | A1* | 3/2014 | Schaefer ........... H01M 10/5053 429/120 |

FOREIGN PATENT DOCUMENTS

| | | |
|---|---|---|
| JP | 2003109650 A | 4/2003 |
| JP | 2004319462 A | 11/2004 |
| JP | 2006179286 A | 7/2006 |
| JP | 2008084690 A | 4/2008 |
| JP | 2008198372 A | 8/2008 |
| JP | 2009277374 A | 11/2009 |

OTHER PUBLICATIONS

Extended European Search Report dated Jun. 22, 2015 in European Patent Application No. 14199229.7 filed Dec. 19, 2015.

* cited by examiner

FUEL CELL MODULE

CROSS-REFERENCE TO RELATED APPLICATIONS

This application claims priority to EP Application No. 14199229.7, filed Dec. 19, 2014, the contents of which is hereby incorporated herein by reference.

BACKGROUND

Field of the Invention

The invention relates to a fuel cell module.

Background of the Invention

Fuel cells allow a utilization of energy of a fuel by energy conversion. In this respect, both electrical energy, which is generated on the basis of electrochemical processes, and thermal energy, which arises in the form of hot waste gases, can be utilized. Gaseous flows of two reactants are conducted separately through the cells for this purpose. The first reactant in the form of environmental air, or just air, contains oxidizing components; the second reactant contains reducing components. A combustion gas (e.g. natural gas) which contains methane is in particular used as the second reactant; it is conducted through a reformer prior to the entry into the cells and is there converted into the reducing components of hydrogen and carbon monoxide and thus into the so-called process gas. In the following, the second reactant is called a combustion gas or natural gas, which should also be understood as other suitable gases having reducing components.

A fuel cell module has a plurality of fuel cells which are arranged in a so-called cell stack. The individual fuel cells are then stacked in an axial direction and are supplied together via a gas supply system with combustion gas in the form of natural gas. A first accumulator is arranged at a first axial end of the cell stack and a second accumulator is arranged at a second axial end of the cell stack. The electrical energy generated by the fuel cells can be picked up and led off via the two accumulators. Such a fuel cell module is described, for example, in EP 1 864 347 B1.

US 2001/046619 A1 likewise describes such a fuel cell module in which a power connection is additionally arranged at a gas supply system and is electrically conductively connected to the second accumulator.

SUMMARY

It is in particular the object of the invention to provide a fuel cell module which allows a simple design. This object is satisfied in accordance with the invention by a fuel cell module having the features described herein.

The fuel cell module has fuel cells arranged in a cell stack and a gas supply system for supplying gas for the operation of the fuel cells. The gas can in this respect be configured either as the combustion gas, that is in particular natural gas, or as the oxidizing component, that is in particular air. It is assumed in the following that the combustion gas is supplied via the named gas supply system. The fuel cells are stacked in an axial direction. A first accumulator is arranged at a first axial end of the cell stack and a second accumulator is arranged at a second axial end of the cell stack. The electrical energy generated by the fuel cells can be picked up and led off via the two accumulators. The first and second axial ends of the cell stack are in this respect arranged disposed opposite one another in the axial direction.

A power connection which is electrically conductively connected to the second accumulator is arranged at the gas supply system. An electrical connection to the second accumulator can thus be established via the power connection. No electrical line to the second accumulator which has to be laid separately is thus necessary for the leading off of the generated electrical energy, which makes the design of the fuel cell module particularly simple. Since high temperatures of several hundred degrees typically prevail in the fuel cells in the operation of the fuel cell module, an insulation of the fuel cells is usually necessary. It is advantageous for an effective insulation and also for its simple attachment if the insulation has as few openings as possible. One opening is in any case necessary for the gas supply system since the combustion gas has to be supplied to the fuel cell module from the outside. Since in accordance with the invention the power connection for the second accumulator is arranged at the gas supply system, no additional opening is necessary in the insulation for the electrical connection to the second accumulator.

In accordance with the invention, the cell stack is arranged within an insulation sheath and the gas supply system is arranged partly outside the insulation sheath. The power connection arranged at the gas supply system is arranged outside the insulation sheath. The gas supply system thus leads through the insulation sheath. The power connection of the fuel cell module has to be suitably connected electrically before the putting into operation of the fuel cell module. This is possible very simply and thus inexpensively when the power connection is arranged outside the insulation sheath in accordance with the embodiment of the invention.

The fuel cells are in particular designed as high-temperature fuel cells of the SOFC type ("solid oxide fuel cell"). In particular environmental air which can also be filtered before the supply to the cell stack is used as the air. In the operating state of the fuel cell module, the axial direction is typically aligned perpendicular to the ground. When "up" and "down" are spoken of in the following, this relates to the described orientation of the fuel cell module in the operating state.

In an embodiment of the invention, the gas supply system is formed at least in part from an electrically conductive material. The electrically conductive connection is then established via the gas supply system. No separate electrical line, for example in the form of a cable, is thus necessary to the second accumulator. This makes possible a particularly simple and inexpensive design of the fuel cell module. In addition, there is no risk that the named cable is not correctly connected during assembly or that it fails in operation. A reliable operation of the fuel cell module is thus made possible. The gas supply system can also be formed completely or with the exception of parts of the power connection from an electrically conductive material. The electrically conductive material can be steel, for example.

Since the gas supply system is arranged partly inside and partly outside the insulation sheath, it so-to-say forms a thermal bridge through the insulation. A cooling of the gas supply system results due to the flowing through of the gas supply system also serving as an electrical conductor by the gas from outside the insulation to inside the insulation. The led off heat is so-to-say led back again. The more solid the gas supply system is, the more it acts as a thermal bridge; on the other hand, a solid design results in a low electrical resistance and thus in small electrical losses. Due to the described cooling effect, the gas supply system can be designed such that an electrical resistance results which is as low as possible.

The gas supply system in particular has a gas supply line and a gas connection arranged at the gas supply line. The gas supply line is arranged partly outside the insulation sheath. The gas supply line is thus also arranged partly inside the insulation sheath and leads through it. The power connection is in this case arranged at the part of the gas supply line arranged outside the insulation sheath or at the gas connection. The gas connection in this respect serves for the connection of the gas supply system and thus of the fuel cell module to an external supply of combustion gas, that is for example to a public natural gas network.

In an embodiment of the invention, the second accumulator and the gas supply system are formed in one piece. The accumulator, the gas supply system and the power connection thus only form a single component. The fuel cell module thus only has a small number of individual parts, which makes an assembly of the fuel cell module simple and thus inexpensive. If the electrical connection is established between the power connection and the second accumulator, the one-piece design also produces a particularly secure electrical connection since an unwanted interruption of the electrically conductive connection is so-to- say not possible. A particularly reliable operation of the fuel cell module is thus made possible. The one-piece design of the gas supply system can, for example, be achieved by welding or brazing of the individual components such as the accumulator, gas supply line and gas connection. The named components can likewise comprise individual parts which are welded or brazed, for example.

A reformer is arranged within the gas supply system in an embodiment of the invention. The reformer serves to convert the methane present in the combustion gas into the reducing components of hydrogen and carbon monoxide. It is thus made possible that the reformer can be accommodated in a space-saving manner and it can additionally be placed into the gas supply system as part of a pre-assembly, which allows a simple and inexpensive assembly of the fuel cell module. The reformer is in particular arranged in the gas supply line which can have a special sheath for this purpose. The reformer is in this respect not considered part of the gas supply system.

In an embodiment of the invention, the second accumulator and in particular also the first accumulator have the same outside contour as the fuel cells. An effective operation and simultaneously a compact design of the fuel cell module are thus made possible. The fuel cells and thus also the accumulators in particular have a circular cross-section transverse to the axial direction. They can, however, also have a different cross-section, such as elliptical, rectangular or quadratic. The outside contour should here be understood as the contour in a plane perpendicular to the axial direction.

In an embodiment of the invention, the fuel cell module has a tensioning element by means of which the first and second accumulators and thus the cell stack can be at least indirectly tensioned. The tensioning element is electrically conductively connected to the first accumulator so that the necessary electrical contact of the first accumulator can take place via the tensioning element. A particularly simple and inexpensive design of the fuel cell module can thus be made possible.

A tensioning of the cell stack is described, for example, in EP 1 864 347 B1.

The tensioning element can be directly or indirectly connected to the first accumulator via a cover or a so-called tensioning brace.

The described contact of the first accumulator can in this respect also be implemented independently of the arrangement of a power connection at the gas supply system in accordance with the invention described herein.

In an embodiment of the invention, the gas supply system is at least partly arranged in a fuel cell base which is formed from an insulation material. An insulation of the cell stack is thus also achieved in the region of the gas supply system. The gas supply system is in particular designed such that the gas supply line on the side remote from the fuel cells in the axial direction lead to the second accumulator. The fuel cell base is thus likewise arranged at the side of the second accumulator remote from the fuel cells and provides an insulation of the cell stack in the axial direction. In addition, the fuel cell base is typically arranged beneath the cell stack in the operating state of the fuel cell module and thus serves its secure support and so-to-say as the base of the total fuel cell module.

In an embodiment of the invention, the fuel cell base has the same outside contour as the fuel cells. A particularly compact design of the fuel cell module is thus possible.

In an embodiment of the invention, the fuel cell base is formed from two different insulation materials. The fuel cell base in particular has an inner part composed of a first insulation material and an outer part composed of a second insulation material. It is not necessary in this respect that the fuel cell base is formed from two different insulation materials over its total extent in the axial direction. The fuel cell base can also comprise more than two different insulation materials.

The first insulation material in particular has a higher strength and/or a smaller heat insulation effect than the second insulation material. The insulation effect and the support effect of the fuel cell case can thus be particularly easily adapted to the given requirements. It is thus possible to design the fuel cell base as having a high mechanical load capability in the interior and as having particularly good heat insulation at the exterior. The first insulation material can, for example, consist of a ceramic insulation material on a base of calcium and/or magnesium and/or aluminum silicate and can additionally include iron oxide and/or titanium oxide and/or potassium oxide and/or sodium oxide. The second insulation material can be formed, for example, as an inorganic material on a base of silica with infrared opacifiers. Such insulation materials are commercially available without problem.

In an embodiment of the invention, the fuel cell base has at least one exhaust gas passage which is in particular at least partly arranged in the inner part of the fuel cell base.

Hot exhaust gas which has to be led off and in particular has to be led to a chimney arises in the electromagnetic reaction in the fuel cells and in the so-called afterburning. The arrangement of an exhaust gas passage in the fuel cell base allows a particularly compact design of the fuel cell module. In addition, an insulation of the exhaust gas is thus also achieved with respect to the other components of the fuel cell module. The fuel cell base in particular has a plurality of exhaust gas passages in specifically four exhaust gas passages.

In an embodiment of the invention, the fuel cell module has a heat exchanger which is arranged directly adjacent to the fuel cell base and in particular beneath the fuel cell base. In this heat exchanger, the thermal energy is removed from the exhaust gas and is supplied, for example, to the water of a heating circuit. The heat exchanger thus acts as a heat sink for the fuel cell module. The gas supply system and thus also the power connection arranged at the gas supply system are thus at least indirectly connected to the heat exchanger in a heat removing manner. It is thus made possible that the power connection also does not have too high a temperature, for example always a maximum of 100° C., in the operation of the fuel cell module and thus no special electrical elements, for example plug-in connections, have to be used which are suitable for very high temperatures. This allows an inexpensive design of the power connection and thus of the fuel cell module.

Further advantages, features and details of the invention result with reference to the following description of embodiments and with reference to drawings in which elements which are the same or have the same function are provided with identical reference numerals.

BRIEF DESCRIPTION OF THE DRAWINGS

The invention will be explained in more detail hereinafter with reference to the drawings.

DETAILED DESCRIPTION OF THE EMBODIMENTS

Figure 1:
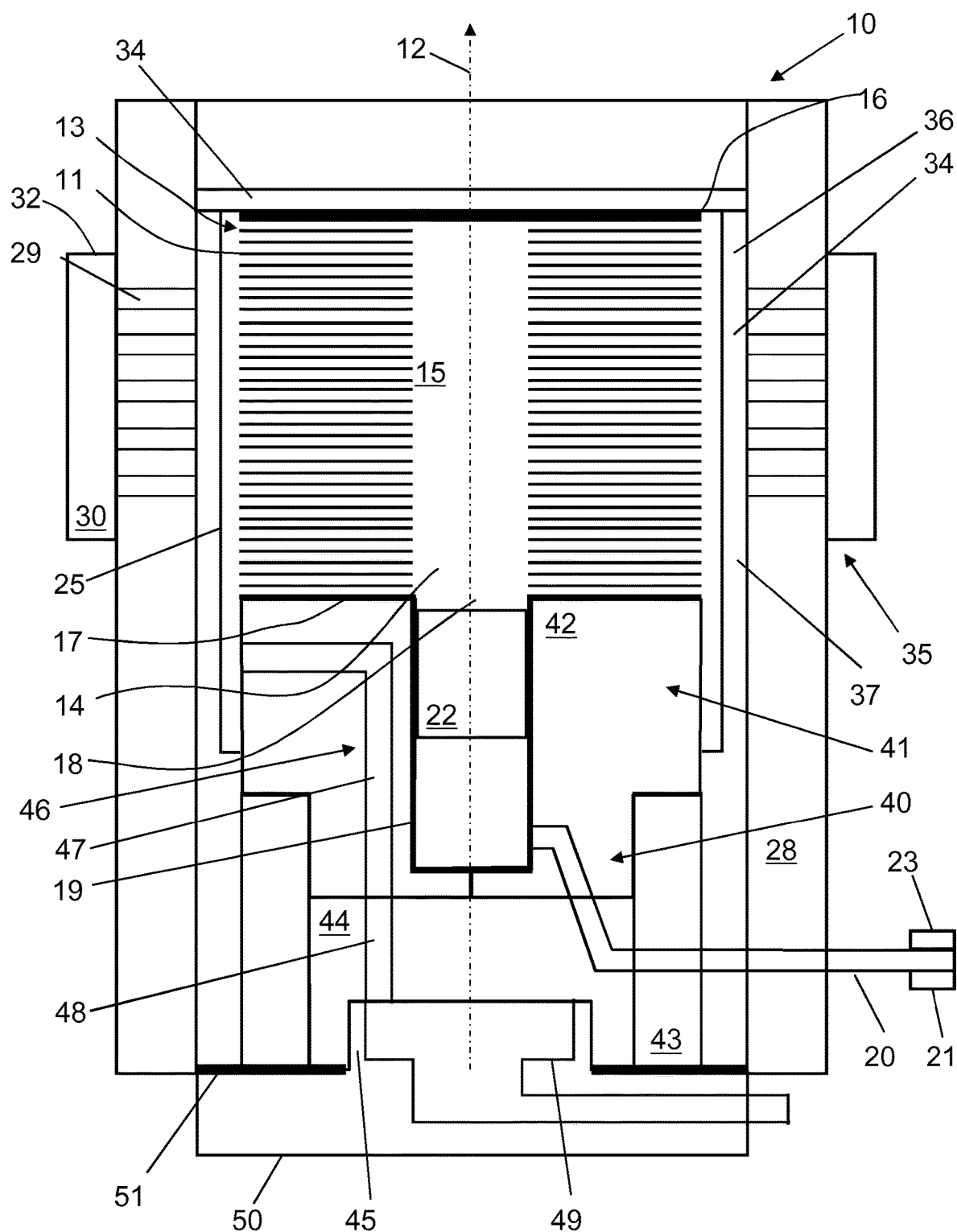
FIG. 1 is a fuel cell module in a longitudinal section.
Figure 2:
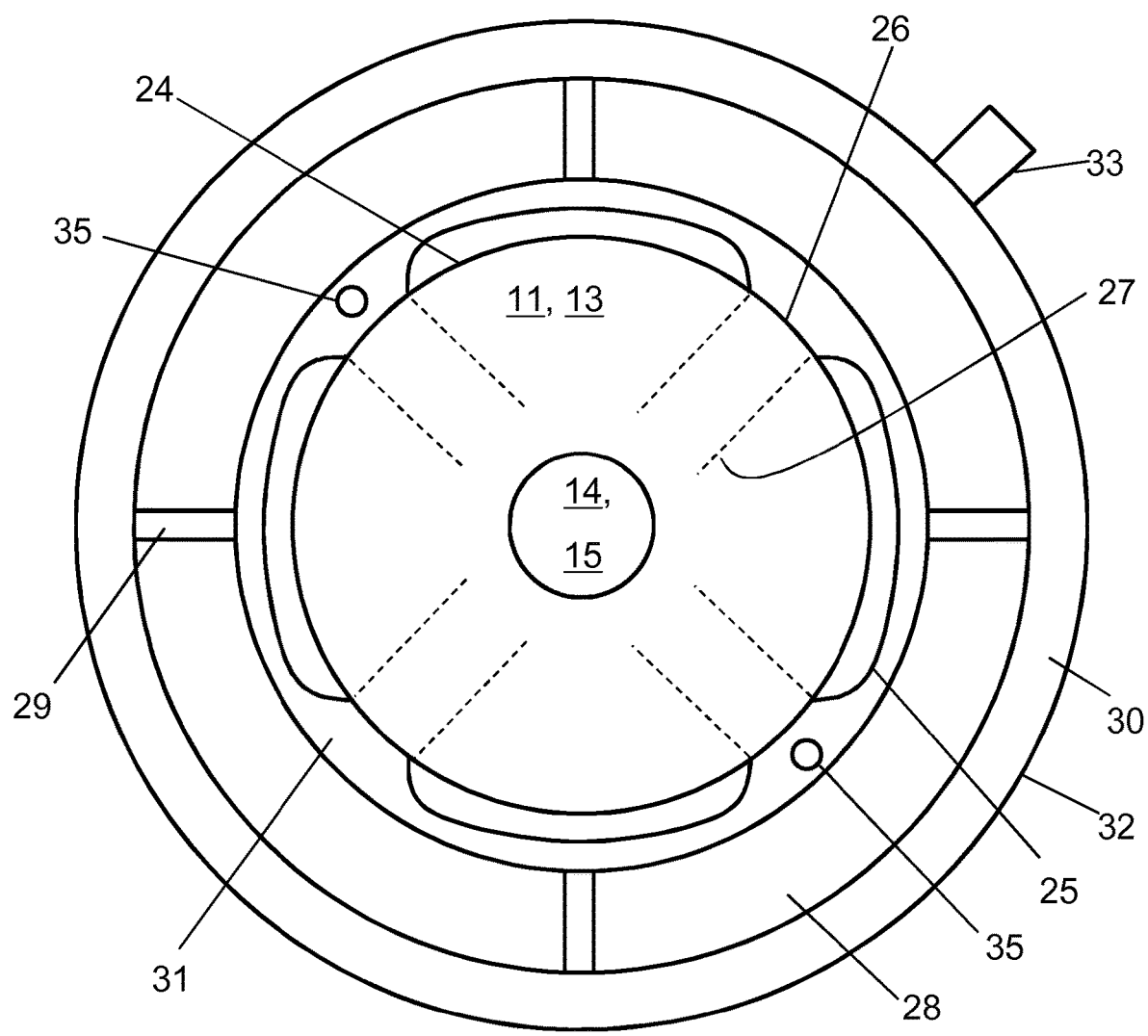
FIG. 2 is the fuel cell module in a cross-section.

In accordance with FIG. 1, a fuel cell module 10 has a plurality of fuel cells 11 which are stacked on one another in an axial direction 12 and thus form a cell stack 13. The individual fuel cells 11 have a disk-shaped basic shape with a circular cross-section (see FIG. 2) and thus a round outside contour transverse or perpendicular to the axial direction 12 so that the cell stack 13 has a cylindrical basic shape. The fuel cells can, however, also have a different cross-section, such as elliptical, rectangular or quadratic.

The fuel cells 11 have an inner opening 14 centrally in the axial direction 12 (see FIG. 2) so that a cylindrical distribution channel 15 is formed in the cell stack 13, from which distribution channel natural gas can be supplied to each fuel cell 11 for the electrochemical reaction taking place in the fuel cells 11.

The cell stack 13 is upwardly terminated by an upper, first accumulator 16. The upper accumulator 16 has a basic shape identical to the fuel cells 11, but does not have an inner opening. It thus has the same outside contour as the fuel cells 11. The upper accumulator 16 forms the anode of the voltage generated by the cell stack 13. The upper accumulator 16 contacts a cylindrical cover 34 and is electrically conductively connected thereto. The cover 34 is tensioned with a base plate 51 by means of two mainly cylindrical tensioning elements 35 which are only shown in FIG. 2. The tensioning elements 35 for this purpose extend along the cell stack 13. At least one of the two tensioning elements 35 is electrically conductively connected to the cover 34 so that the required electrical contact of the upper accumulator 16 takes place via at least one of the two tensioning elements.

The tensioning and thus the described contact can take place by means of a mainly parallelepiped yoke instead of by means of a cylindrical cover.

The electrical contact of the upper accumulator an, however, also take place in a different manner.

The cell stack 13 is downwardly terminated by a lower second accumulator 17 which forms the cathode of the voltage generated by the cell stack 13. The tensioning elements 35 thus also indirectly tension the upper and lower accumulators 16, 17. The lower accumulator 17 likewise has a basic shape identical to the fuel cells 11 and has a circular inner opening 18. It thus has the same outside contour as the fuel cells 11. The lower accumulator 17 is welded to a hollow cylindrical sheath 19 which is part of a gas supply line 20 at which a gas connection 21 is arranged. Process gas can thus be supplied to the distribution channel 15 of the cell stack 13 via the gas connection 21, the gas supply line 20, the sheath 19 and the inner opening 18 of the lower accumulator 17. The gas connection 21 and the gas supply line 20 with the sheath 19 thus form a gas supply system 40 for supplying combustion gas to the cell stack 13. A reformer 22 is arranged in the sheath 19 and in it the methane gas present in the supplied natural gas is converted before the supply into the distribution channel 15 into hydrogen and carbon monoxide and thus into process gas. The second accumulator 17, the sheath 19, the gas supply line 20 and the gas connection 21 are formed from an electrically conductive material in the form of steel such that the gas connection 21 is electrically conductively connected to the accumulator 17. The total gas supply system 40 is thus formed from electrically conductive material. The individual parts of the gas supply system 40 and of the lower accumulator 17 are welded to one another so that the gas supply system 40 and the lower accumulator 17 are formed in one piece.

Figure 3:
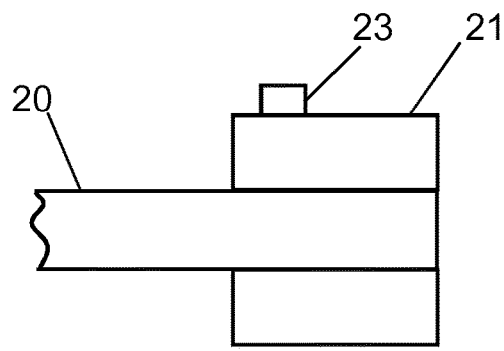
FIG. 3 is a gas connection of the fuel cell module.

In accordance with FIG. 3, a schematically shown power connection 23 is arranged at the gas connection 21 and an electrical connection to the lower accumulator 17 can be established via it via the gas connection 21 and the gas supply line 20. The power connection can, for example, be formed as an electrical plug-in connection. It is, however, likewise possible that it has a clamp into which a cable can be clamped tight by means of a screw.

The air required for the electrochemical reaction taking place in the fuel cells 11 is supplied to the cell stack 13 from the outside. This will be explained with reference to FIG. 2. Four identical exhaust gas passages 25 are arranged distributed evenly at a round outside contour 24 of the cell stack 13 and thus of the fuel cells 11. Gaps 26 via which air can be supplied to the fuel cells 11 are produced between the exhaust gas passages 25. The fuel cells 11 have air guide elements 27 which extend from the gaps 26 in the direction of the distribution channel 15. Air can thus flow, starting from the gaps 26, via the air guide elements 21 in the direction of the distribution passage 15 and outwardly again from there, with the electrochemical reaction with the hydrogen and with the carbon monoxide being able to take place. The exhaust gases of the electrochemical reaction and still non-reacted components, move into the exhaust gas passages 25 in which a so-called afterburning, that is an oxidation of the non-reacted hydrogen and of the carbon monoxide, also takes place. The exhaust gas is led off in the direction of the lower accumulator 17 via the exhaust gas passages 25.

A hollow cylindrical insulation sheath 28 is arranged around the cell stack 13 so that the cell stack 13 is arranged within the insulation sheath 28. The insulation sheath 28 is formed from a ceramic material and has passage openings 29 which lead from the outside to the inside, with four passage openings 29 being arranged in the sectional plane of FIG. 2. Air can be supplied via the passage openings 29 from a outwardly formed supply space 30 into an air distribution space 31 formed between the cell stack 13 and the insulation sheath 28. The passage openings 29 are in this respect arranged such that they conduct air directly toward the exhaust gas passages 25. The air then mainly flows in the peripheral direction along the exhaust gas passages 25 to the above-described gaps 26 in order then to flow as described in the direction of the distribution passage 15. The supplied air thus cools the exhaust gas passages 25 which then cool the cell stack 13 via convection. The air also flows partly in the axial direction in order thus also to arrive at the fuel cells 11 at which axial position a passage opening is not directly arranged. Since a pressure loss on the flowing into the fuel cells 11 is comparatively large, air is distributed in the axial direction of the distribution space 31 so that all the fuel cells 11 are equally supplied with air.

The supply space 30 is outwardly bounded by a supply element 32. The supply element 32 is arranged in circular form about the insulation sheath 28. Air is only supplied to the supply space 30 via an air supply 33. It is in this respect the air required for the operation and the cooling. So much air is supplied via the air supply 33 that a so-to-say constant pressure forms in the supply space 30.

As shown in FIG. 1, the gas connection 21 and thus also the power connection 23 are arranged outside the insulation sheath 28. The gas supply line 20 also leads through the insulation sheath 28 and is thus partly arranged inside the insulation sheath 28 and partly outside the insulation sheath 28.

A fuel cell base 41 is arranged beneath the lower accumulator 17; it has the same outside contour as the lower accumulator 17 and thus also as the cell stack 13 and the upper accumulator 16. A part of the gas supply system 40, namely a part of the supply line 20 with the sheath 19, is thus also arranged in the fuel cell base 41. The fuel cell base 41 has an upper part 42 which is adjacent to the lower accumulator 17 and also has the same outside contour as the lower accumulator 17. The upper part 42 of the fuel cell base 41 comprises a plurality of parts which are, however, not shown more exactly in FIG. 1. An outer part 43 of the fuel cell base 41 downwardly adjoins the upper part 42 of the fuel cell base 41 in the radially outer region. The outer part 43 of the fuel cell base 41 has a hollow cylindrical base shape having an outside contour substantially the same as the lower accumulator 17. An inner part 44 of the fuel cell base 41 is arranged within the outer part 43 of the fuel cell base 41 and only starting further down than this. This inner part 44 has a cylindrical base shape. The inner part 44 has a cylindrical recess 45 at its lower side.

The fuel cell base 41 comprises two different insulation materials. The inner part 44 and the upper part 42 comprise a ceramic insulation material on a base of calcium silicate which has a very high strength. The outer part 43 comprises an inorganic insulation material on a silica base which has a smaller strength and a higher heat insulation effect in comparison with the first insulation material.

A total of four exhaust gas passages 46 are provided in the fuel cell base 41 for leading off the exhaust gas of the fuel cells 11 and only one of them is shown in FIG. 1 for reasons of clarity. The exhaust gas passage 46 is composed of an upper exhaust gas passage part 47 in the upper part 42 of the fuel cell base 41 and of a lower exhaust gas passage part 48 in the inner part 44 of the fuel cell base 41. The upper exhaust gas passage part 47 first extends radially inwardly from the outside and subsequently directly downwardly. It is outwardly connected to an exhaust gas passage 25 so that the exhaust gas emanating from the fuel cells 11 can flow via the exhaust gas passage 25 into the upper exhaust gas passage part 47. The other three exhaust gas passages, not shown, are likewise each associated with an exhaust gas passage 25. The lower exhaust gas passage part 48 which ends in the recess 45 of the inner part 44 of the fuel cell base 41 adjoins the upper exhaust gas passage part 47 in an aligned manner. An exhaust manifold 49 is arranged in the recess 45; it collects the exhaust gases of the four exhaust gas passages 46 and conducts them through a heat exchanger 50 arranged directly beneath the fuel cell base 41. The heat exchanger 50 is thus arranged directly adjacent to the fuel cell base 41, with the base plate 51 being arranged between the fuel cell base 41 and the heat exchanger.

Heat is stripped from the exhaust gas in the heat exchanger 50 before said exhaust gas is led off into the environment via a chimney, not shown. For this purpose a heat carrier medium, not shown circulates in the heat exchanger 50 and can in turn output the heat to a room heating or can be utilized for heating process water.

The invention claimed is:

1. A fuel cell module comprising:
   fuel cells arranged in a cell stack having a first axial end and a second axial end;
   a gas supply system configured to supply gas for the operation of the fuel cells, the gas supply system comprising a gas connection and a gas supply line connected to the gas connection, the gas connection connecting the gas supply system to a supply of gas, the fuel cells being stacked in an axial direction;
   a first accumulator arranged at the first axial end of the cell stack;
   a second accumulator is arranged at the second axial end of the cell stack; and
   a power connection electrically conductively connecting the gas supply line to the second accumulator, the power connection being arranged at the gas connection,
   the cell stack being arranged within an insulation sheath,
   the gas connection and the power connection each being arranged entirely outside of and not in contact with the insulation sheath such that an electrical current generated by the cell stack is conducted by the gas supply system through the insulation sheath,
   the gas supply line being arranged partly outside the insulation sheath and partly inside the insulation sheath, and
   the gas supply line extending into an interior of the insulation sheath.

2. A fuel cell module in accordance with claim 1, wherein the gas supply system is formed at least partly from an electrically conductive material and the gas supply line is electrically conductively connected to the second accumulator via the gas supply system.

3. A fuel cell module in accordance with claim 1, wherein the second accumulator and the gas supply system are configured in one piece.

4. A fuel cell module in accordance with claim 1, wherein a reformer is arranged within the gas supply system.

5. A fuel cell module in accordance with claim 1, wherein the second accumulator and the first accumulator have the same outside contour as the fuel cells.

6. A fuel cell module in accordance with claim 1, further comprising a tensioning element configured to at least indirectly tension the first and second accumulators and being electrically conductively connected to the first accumulator.

7. A fuel cell module in accordance with claim 1, wherein the gas supply system is arranged at least partly in a fuel cell base which is formed from an insulating material.

8. A fuel cell module in accordance with claim 7, wherein the fuel cell base has the same outside contour as the fuel cells.

9. A fuel cell module in accordance with claim 7, wherein the fuel cell base is formed from two different insulation materials.

10. A fuel cell module in accordance with claim 9, wherein the fuel cell base has an inner part composed of a first insulation material and an outer part composed of a second insulation material and the first insulation material has a higher strength than the second insulation material.

11. A fuel cell module in accordance with claim 10, wherein the exhaust gas passage is formed at least partly in the inner part of the fuel cell base.

12. A fuel cell module in accordance with claim 9, wherein the fuel cell base has an inner part composed of a first insulation material and an outer part composed of a second insulation material and the first insulation material has a smaller heat insulation effect than the second insulation material.

13. A fuel cell module in accordance with claim 7, wherein the fuel cell base has at least one exhaust gas passage.

14. A fuel cell module in accordance with claim 7, further comprising a heat exchanger arranged directly adjacent to the fuel cell base.

15. A fuel cell module in accordance with claim 1, wherein the power connection is selected from the group consisting of a plug-in connection and a cable surrounded by a clamp.

16. A fuel cell module in accordance with claim 1, wherein the gas supply is configured to supply combustion gas or oxidant gas for the fuel cell.

\* \* \* \* \*